United States Patent
Turner

(10) Patent No.: US 8,640,380 B2
(45) Date of Patent: Feb. 4, 2014

(54) DETERRENT DEVICE

(75) Inventor: Grahame D. A. Turner, Ringwood (GB)

(73) Assignee: P & L Systems Limited, Knaresborough (GB)

( * ) Notice: Subject to any disclaimer, the term of this patent is extended or adjusted under 35 U.S.C. 154(b) by 169 days.

(21) Appl. No.: 13/372,793

(22) Filed: Feb. 14, 2012

(65) Prior Publication Data

US 2013/0097916 A1 Apr. 25, 2013

(30) Foreign Application Priority Data

Oct. 19, 2011 (GB) .................................... 1118031.2

(51) Int. Cl.
*A01M 19/00* (2006.01)

(52) U.S. Cl.
USPC .................................. 43/98; 43/1; 340/573.2

(58) Field of Classification Search
USPC .................. 43/98, 1, 112; 340/537.2; 256/10; 361/32; 119/537
See application file for complete search history.

(56) References Cited

U.S. PATENT DOCUMENTS

| 3,370,793 A | 2/1968 | Chilcote |
| 7,802,396 B2 | 9/2010 | Donoho |
| 8,015,747 B2 | 9/2011 | Donoho |
| 8,020,340 B2 | 9/2011 | Donoho |
| 2005/0183880 A1 | 8/2005 | Waldorf et al. |
| 2008/0028668 A1 | 2/2008 | Pollman |
| 2010/0180490 A1 | 7/2010 | Donoho |
| 2011/0030621 A1 | 2/2011 | Donoho |

FOREIGN PATENT DOCUMENTS

| DE | 3930013 | 3/1991 |
| EP | 1 119 243 | 5/2003 |
| WO | 90/11001 | 9/1990 |
| WO | 95/08915 | 4/1995 |
| WO | 2005/055865 | 6/2005 |
| WO | 2011/015867 | 2/2011 |

*Primary Examiner* — Christopher P Ellis
(74) *Attorney, Agent, or Firm* — Carmody & Torrance LLP

(57) ABSTRACT

There is provided a deterrent device 10 having an elongate body 11 formed from an extrudable insulating material. The device has at least one elongate knitted/braided metallic conductor 19 on an upward facing surface of the body 11, the material of the body penetrating into the lower margins of the or each conductor thereby securing the or each conductor to the body with the upward facing surface of the or each conductor being exposed. This construction enables the conductors to be co-extruded with the body thereby avoiding the need for further fastening devices and enables manufacture in a single operation.

10 Claims, 1 Drawing Sheet

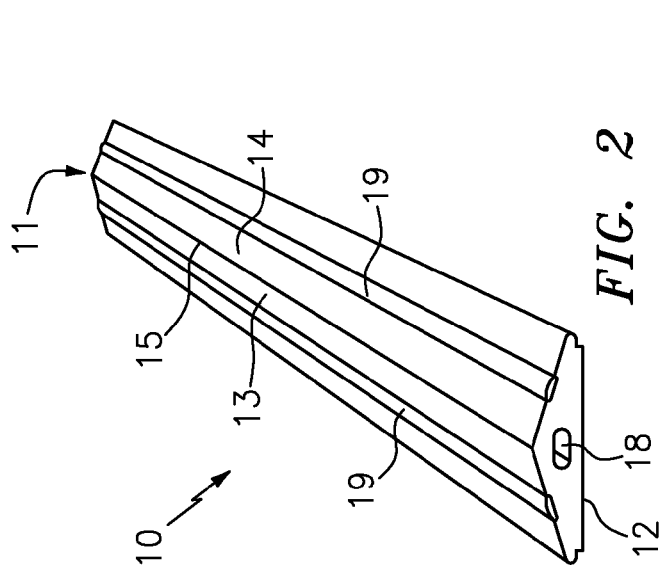
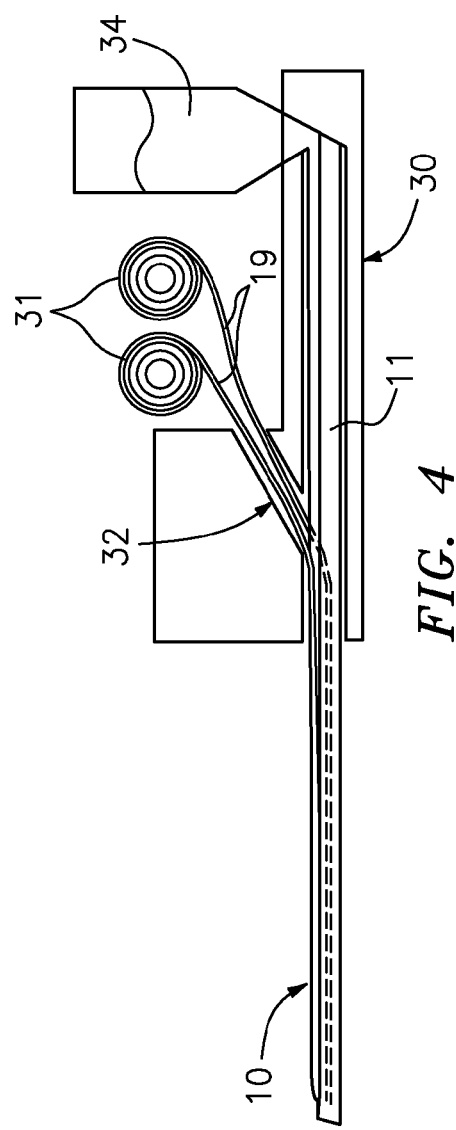
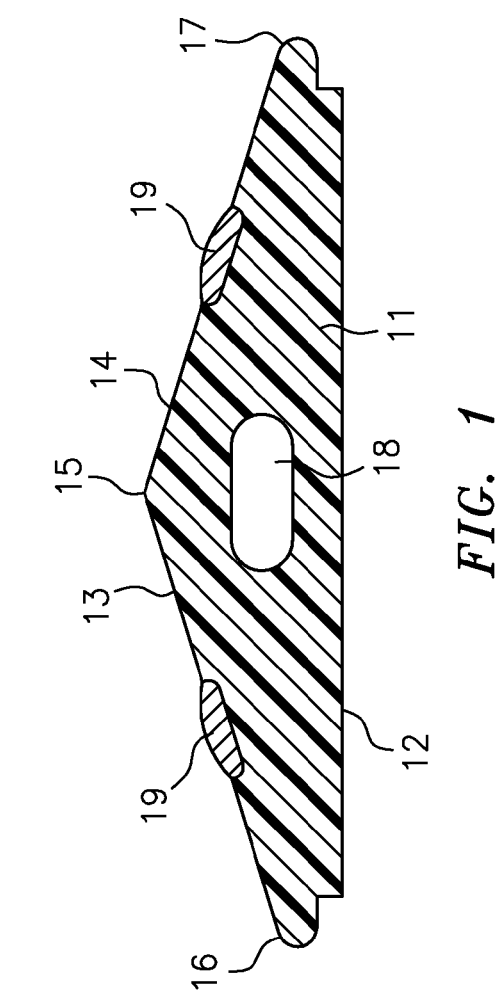
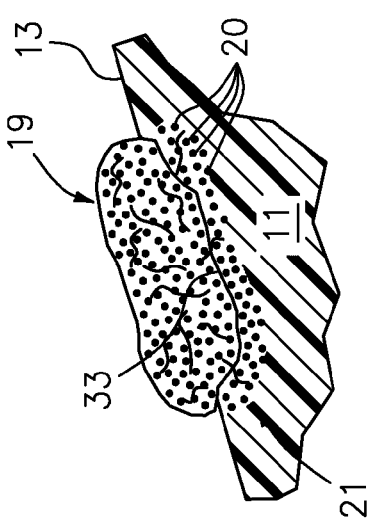

DETERRENT DEVICE

The present invention relates to deterrent devices and more particularly to electric devices intended to deter the presence of birds, animals or other creatures such as reptiles and insects.

It is known to provide deterrent devices comprising an electrified elongate track on various surfaces such as walls, fences, roofs, window ledges, parapets etc. The elongate tracks usually have a pair of exposed, elongate conductor strips which are spaced apart along the length of the track, the conductor strips being connected to a source of electricity often known as an energiser. Contact with the strips by a creature will result in a controlled electric shock being imparted to the creature, thereby causing the creature to move away. Other arrangements are known in which only a single conductor strip is provided and others in which more than two conductor strips are provided.

With some known devices the conductor strips are in the form of metal filaments which are braided or knitted together. The braids/knitted meshes are stitched to a PVC base. The stitching holes can allow water ingress, which can in turn lead to short circuiting/arcing between the two conductors. The electricity can pass down from the braid through the stitching holes to the underside of the base, then if the mounting surface is metal or is damp the electricity can pass through that, and then back up through the damp stitching holes on the other side. This short circuiting/arcing can cause loss of voltage/power, rendering the system ineffective and it can also cause disturbing loud clicks every time the energiser pulses and also damage to the device. The stitching can also rot and deteriorate over time thereby compromising the overall integrity of the product due to detachment of the conductor strips.

According to a first aspect of the present invention there is provided a deterrent device comprising an elongate body formed from an extrudable insulating material and at least one elongate knitted/braided metallic conductor provided on an upward facing surface of the elongate body, the material of the elongate body penetrating into the lower margins of the or each knitted/braided metallic conductor thereby securing it to the elongate body with an upward facing surface of the or each knitted/braided metallic conductor being exposed.

Preferably two elongate knitted/braided metallic conductors are provided on the device. Usually the two metallic conductors are parallel to each other along the length of the elongate body.

In preferred arrangements the upward facing surface of the elongate body has two elongate sloping surfaces which meet at a central raised elongate apex, one metallic conductor being provided on each side of the apex and projecting slightly above the associated sloping surface.

It is a preferred feature that the elongate body incorporates a lengthwise extending hollow open only at its two ends. Another preferred feature is that the elongate body has a base surface oppositely disposed to said upward facing surface, the upward facing surface overhanging the base surface along each lateral edge of the elongate body. In some arrangements the base surface is formed with grooves to improve adhesive contact area when being secured in use.

Conveniently, the elongate body is made from PVC.

According to a second aspect of the present invention there is provided a method of producing a deterrent device comprising the step of extruding an elongate body, uniting one or more elongate knitted/braided metallic conductors with the elongate body as the elongate body is being extruded, the material of the elongate body penetrating into the adjacent margin of the or each knitted/braided metallic conductor and cooling the deterrent device to secure the or each knitted/braided metallic conductor to the elongate body.

Preferably two elongate knitted/braided metallic conductors are united with the elongate body, each elongate conductor being fed from a reel into an extension die through which the extrudable material of the elongate body is forced.

Embodiments of the present invention will now be described in more detail. The description makes reference to the accompanying drawings in which:

FIG. 1 is a lateral cross-section through a deterrent device according to the present invention, FIG. 2 is a perspective view of a length of deterrent device shown in FIG. 1, FIG. 3 is a diagrammatic representation of an enlarged lateral cross-section through a portion of deterrent device shown in FIG. 1, and FIG. 4 is a schematic lengthwise cross-section through an extrusion device for making the deterrent device of FIGS. 1 to 3.

In the figures there is shown a deterrent device 10 comprising an elongate body 11 extruded from an insulating plastics material such as PVC. Other extrudable non-conductive materials are of course possible. Ideally, the elongate body 11 is somewhat flexible to enable it to be bent according to the contours of the surface to which it is to be mounted. However, the elongate body 11 could be substantially rigid if flexibility is not desired. The elongate body 11 has a generally flat base surface 12 and a pair of sloping upper surfaces 13, 14 which meet centrally at a raised apex 15 which may be pointed or rounded or another suitable shape. The lateral edges 16, 17 of the upper surfaces remote from the apex 15 each overhang the base surface 12. The sloping surfaces 13, 14 of the elongate body 11 enable water such as rain to run off the device and the overhanging edges 16, 17 facilitate drainage of said water and help prevent short circuiting/arcing. The elongate body 11 can be secured to a mounting surface by one of a number of means such as adhesive, adhesive tape, nails, screws, clips, clamps etc. The base surface 12 could be grooved or otherwise textured/contoured to improve any adhesive connection with the mounting surface or could even be contoured so as to mate with formations on the mounting surface.

The elongate body 11 also has an optional lengthwise extending hollow 18 within its thickness. The presence of the hollow 18 improves the flexibility oldie device 10 for when it is secured to a suitable surface such as a wall, roof, window ledge. The hollow 18 is also effective to reduce weight and to reduce material usage. The hollow 18 is optional but in other arrangements one or more additional hollows could be provided within the cross-section of the elongate body 11.

On each sloping surface 13, 14 there is provided an elongate braided/knitted metallic conductor 19 which also extends the full length of the elongate body 11. In this example, the metallic conductor 19 is in the form of one or more thin metallic wires or filaments 20 which are braided or knitted to form an elongate, flexible metallic strip. One example of a suitable metal is steel due to its good conductivity but other metals may be suitable. The braided/knitted steel conductor 19 allows a long length of track to be powered by a single energiser, the energiser usually being an expensive component of the deterrent system. In addition, the braided/knitted form of the conductor 19 enables the device 10 to have good flexibility for following the contours of the mounting surface. At the ends of the elongate body 11, the metallic conductors are arranged for connection to a supply of electricity, known as an energiser, in one of a number of known methods which are not shown or described here. It is also possible to introduce power between the ends of the metallic conductor using a 'jumper' which is known in the art.

The braided/knitted metallic strip 19 is engaged with the material of the elongate body 11 when the elongate body 11 is being extruded. In this way, the heated material used to form the elongate body 11 is able to penetrate between the wires/filaments 20 in the lower margins 21 of the mesh structure of the metallic strip because the braided/knitted nature of the strip 19 is such that there is a pattern of voids between the wires/filaments 20 of the mesh structure. When the material of the elongate body 11 cools and solidifies, this penetration ensures that the braided/knitted strip 19 is securely fastened to the elongate body 11, whilst the upward facing surface of the strip 19 is exposed and is slightly raised relative to the associated sloping surfaces 13, 14.

As shown in FIG. 4, the PVC elongate body 11 is extruded using an extrusion die 30 which is fed with molten or softened PVC at an elevated temperature. Two knitted/braided metallic strips 19 are provided on reels 31 and are fed into the extrusion die 30 at 32 and guided so as to be correctly positioned on the finished product. As the PVC is forced through the die 30, the PVC is urged into the voids between the wires/filaments 20 in the lower margins of the strips 19. This is indicated in FIG. 3 with a schematic boundary 33 indicating the depth of penetration. As the PVC cools and solidifies, the wires/filaments are locked into the PVC and the braided/knitted metallic strips 19 are thus firmly secured to the elongate body 11.

This method of construction is particularly advantageous as there is no need for any fastening means, such as stapling or stitching, to extend through the thickness of the elongate body 11 to the base surface 12 thereby avoiding the short circuiting/arcing issues described in the introduction and also the stitch rotting/deterioration issues. The new method of construction also enables the manufacture to be in a single operation.

The precise geometry of the deterrent device is a matter of design choice and will depend on the type of creatures to be deterred. In one particularly effective arrangement for birds the lateral width of the elongate body 11 is 36 mm, the height of the apex 15 is 8 mm, the lateral overhang of the lateral edges 16, 17 is 2 mm and the metallic strip 19 is 3 mm wide and 0.5 mm thick. This is however only one example of a suitable arrangement.

The invention claimed is:

1. A deterrent device comprising an elongate body formed from an extrudable insulating material and at least one elongate knitted/braided metallic conductor provided on an upward facing surface of the elongate body, the material of the elongate body penetrating into the lower margins of the or each knitted/braided metallic conductor thereby securing it to the elongate body with an upward facing surface of the or each knitted/braided metallic conductor being exposed.

2. A deterrent device as claimed in claim 1 wherein two elongate knitted/braided metallic conductors are provided on the device.

3. A deterrent device as claimed in claim 2 wherein the two elongate knitted/braided metallic conductors are parallel to each other along the length of the elongate body.

4. A deterrent device as claimed in claim 3 wherein the upward facing surface of the elongate body has two elongate sloping surfaces which meet at a central raised elongate apex, one metallic conductor being provided on each side of the apex and projecting slightly above the associated sloping surface.

5. A deterrent device as claimed in claim 1 wherein the elongate body incorporates a lengthwise extending hollow open only at its two ends.

6. A deterrent device as claimed in claim 1 wherein the elongate body has a base surface oppositely disposed to said upward facing surface, the upward facing surface overhanging the base surface along each lateral edge of the elongate body.

7. A deterrent device as claimed in claim 1 wherein the elongate body is made from PVC.

8. A deterrent device as claimed in claim 1 wherein the knitted/braided metallic conductor is formed from one or more knitted/braided metallic filaments.

9. A method of producing a deterrent device comprising the step of extruding an elongate body, uniting one or more elongate knitted/braided metallic conductors with the elongate body as the elongate body is being extruded, the material of the elongate body penetrating into the adjacent margin of the or each knitted/braided metallic conductor and cooling the deterrent device to secure the or each knitted/braided metallic conductor to the elongate body.

10. A method for producing a deterrent device as claimed in claim 9 wherein two elongate knitted/braided metallic conductors are united with the elongate body, each elongate conductor being fed from a reel into an extension die through which the extrudable material of the elongate body is forced.

* * * * *